(12) United States Patent
Bain et al.

(10) Patent No.: US 9,019,135 B2
(45) Date of Patent: Apr. 28, 2015

(54) EFFICIENT STRING HASH COMPUTATION

(71) Applicant: International Business Machines Corporation, Armonk, NY (US)

(72) Inventors: Peter Douglas Bain, Ottawa (CA); Peter Wiebe Burka, Ottawa (CA); Charles Robert Gracie, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 13/843,952

(22) Filed: Mar. 15, 2013

(65) Prior Publication Data

US 2014/0012829 A1    Jan. 9, 2014

Related U.S. Application Data

(63) Continuation of application No. 13/543,010, filed on Jul. 6, 2012, now abandoned.

(51) Int. Cl.
*H03M 7/00* (2006.01)
*G06F 17/30* (2006.01)

(52) U.S. Cl.
CPC ...... *G06F 17/3033* (2013.01); *G06F 17/30985* (2013.01)

(58) Field of Classification Search
USPC .......................................... 341/50, 51, 67, 95
See application file for complete search history.

(56) References Cited

U.S. PATENT DOCUMENTS

| | | | |
|---|---|---|---|
| 4,588,985 A | 5/1986 | Carter et al. | |
| 4,899,128 A * | 2/1990 | Shapiro | 340/146.2 |
| 7,376,685 B2 * | 5/2008 | Lee et al. | 708/200 |
| 7,613,701 B2 | 11/2009 | Zhao et al. | |
| 7,747,635 B1 | 6/2010 | Swidler et al. | |
| 7,783,688 B2 * | 8/2010 | Huber | 713/187 |
| 7,827,384 B2 | 11/2010 | Zhang et al. | |
| 2002/0059475 A1 | 5/2002 | Baentsch et al. | |
| 2011/0043387 A1 | 2/2011 | Abali et al. | |
| 2011/0099175 A1 | 4/2011 | Darcy | |

OTHER PUBLICATIONS

Pokrzywa, Rafal, "Searching for Unique DNA Sequences with the Burrows-Wheeler Transform," Biocybernetics and Engineering 2008, vol. 28, No. 1, pp. 95-104.

(Continued)

*Primary Examiner* — Brian Young
(74) *Attorney, Agent, or Firm* — Nelson and Nelson; Daniel P. Nelson; Alexis V. Nelson

(57) ABSTRACT

A method for efficiently computing a hash value for a string is disclosed. In one embodiment, such a method includes receiving an original string comprising multiple characters. The method computes an original hash value for the original string. The method produces an updated string by performing at least one of the following updates on the original string: adding leading/trailing characters to the original string; removing leading/trailing characters from the original string, and modifying characters of the original string while preserving the length of the original string. The method then computes an updated hash value for the updated string by performing at least one operation on the original hash value, wherein the at least one operation takes into account the updates that were made to the original string. A corresponding apparatus and computer program product are also disclosed.

3 Claims, 5 Drawing Sheets

(56) References Cited

OTHER PUBLICATIONS

Belazzougui, Djamal et al., "Theory and Practise of Monotone Minimal Perfect Hashing," 2008, p. 132-144, URL: http://www.siam.org/proceedings/alenex/2009/alx09_013_belazzouguid.pdf.

Schmidt, Douglas C., "GPERF a Perfect Hash Function Generator," p. 1-13, URL:http://www.cs.wustl.edu/~schmidt/PDF/gperf.pdf.

Plaxton, Greg, "Rabin Karp Algorithm," Department of Computer Science, University of Austin Texas, available at: http://www.cs.utexas.edu/~plaxton/c/337/05f/slides/StringMatching-1.pdf s.

\* cited by examiner a b c d e f

Fig. 3B $a\ b\ c\ d\ e\ f\ g\ h\ i\ j \longrightarrow H(S)$ $a\ b\ c\ d\ e\ f \longrightarrow H(T)$ $H(U) = H(S) - k^m H(T)$ $$a\ b\ c\ d\ e\ f\ g\ h\ i\ j \longrightarrow H(S)$$

$$R = S' - S \longrightarrow H(R)$$

$$H(S') = H(S) + H(R)$$

EFFICIENT STRING HASH COMPUTATION

BACKGROUND

1. Field of the Invention

This invention relates to apparatus and methods for efficiently computing and recomputing hash values for strings.

2. Background of the Invention

Sequences of characters, commonly referred to as "strings," are used extensively in modern-day programming languages. For example, the Java runtime uses the String class extensively. In the Java runtime, every string has a hash value computed over the contents of the string which is used to identify the string. Because strings may be long, computing the hash value for strings can be computationally expensive. Furthermore, because string objects are used heavily by the Java Virtual Machine (JVM) as well as applications running on the JVM, the hash function is invoked frequently. Operation of the hash function, therefore, consumes significant computational resources.

Each time a string is modified, such as by concatenating a substring to an existing string, removing a substring from the beginning or end of an existing string, or modifying a substring within an existing string that preserves the length of the string, the hash value of the modified string needs to be recomputed. Like the original hash value computation, recomputing the hash value can be computationally expensive since the hash value is typically recomputed from scratch. Because string modifications may occur frequently, such recomputations may also occur frequently, consuming significant computational resources.

In view of the foregoing, what are needed are apparatus and methods to efficiently compute and recompute hash values for strings and other sequences of characters. Ideally, such apparatus and methods may be used to efficiently recompute hash values for modified strings without having to start from scratch.

SUMMARY

The invention has been developed in response to the present state of the art and, in particular, in response to the problems and needs in the art that have not yet been fully solved by currently available apparatus and methods. Accordingly, the invention has been developed to provide apparatus and methods for efficiently computing hash values for strings. The features and advantages of the invention will become more fully apparent from the following description and appended claims, or may be learned by practice of the invention as set forth hereinafter.

Consistent with the foregoing, a method for efficiently computing a hash value for a string is disclosed herein. In one embodiment, such a method includes receiving an original string comprising multiple characters. The method computes an original hash value for the original string. The method produces an updated string by performing at least one of the following updates on the original string: adding leading/trailing characters to the original string; removing leading/trailing characters from the original string, and modifying characters of the original string while preserving the length of the original string. The method then computes an updated hash value for the updated string by performing at least one operation on the original hash value, wherein the at least one operation takes into account the updates that were made to the original string.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 3A shows a first scenario where a substring is concatenated to an existing string to produce an updated string;

FIG. 3B shows a technique for efficiently computing the hash value for the updated string illustrated in FIG. 3A.

DETAILED DESCRIPTION

Figure 1:
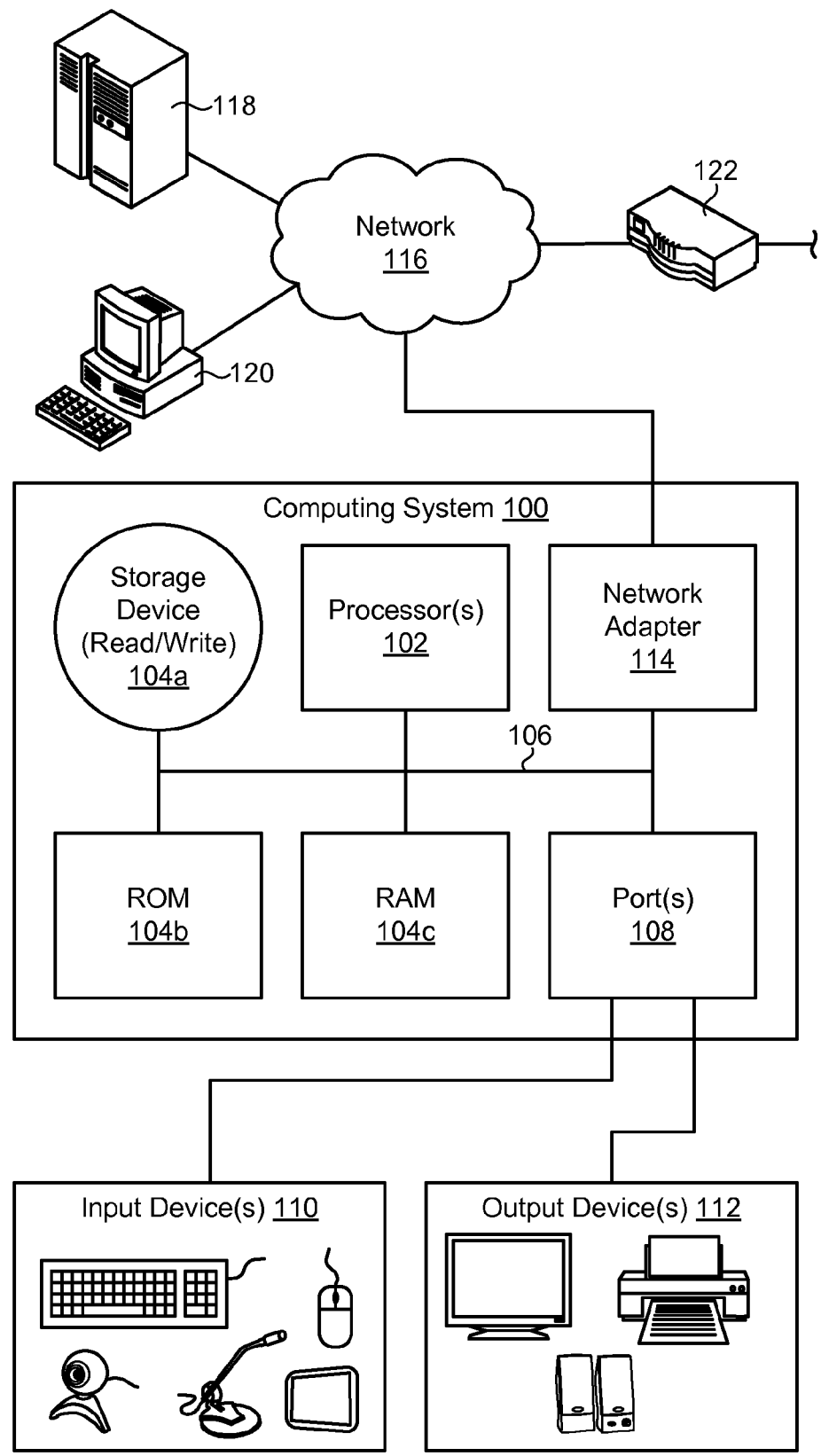
FIG. 1 is a high-level block diagram showing one example of a computing system in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device.

More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java™, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computing system 100 is illustrated. The computing system 100 is presented to show one example of an environment where an apparatus and method in accordance with the invention may be implemented. The computing system 100 is presented only by way of example and is not intended to be limiting. Indeed, the apparatus and methods disclosed herein may be applicable to a wide variety of different computing systems in addition to the computing system 100 shown. The apparatus and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
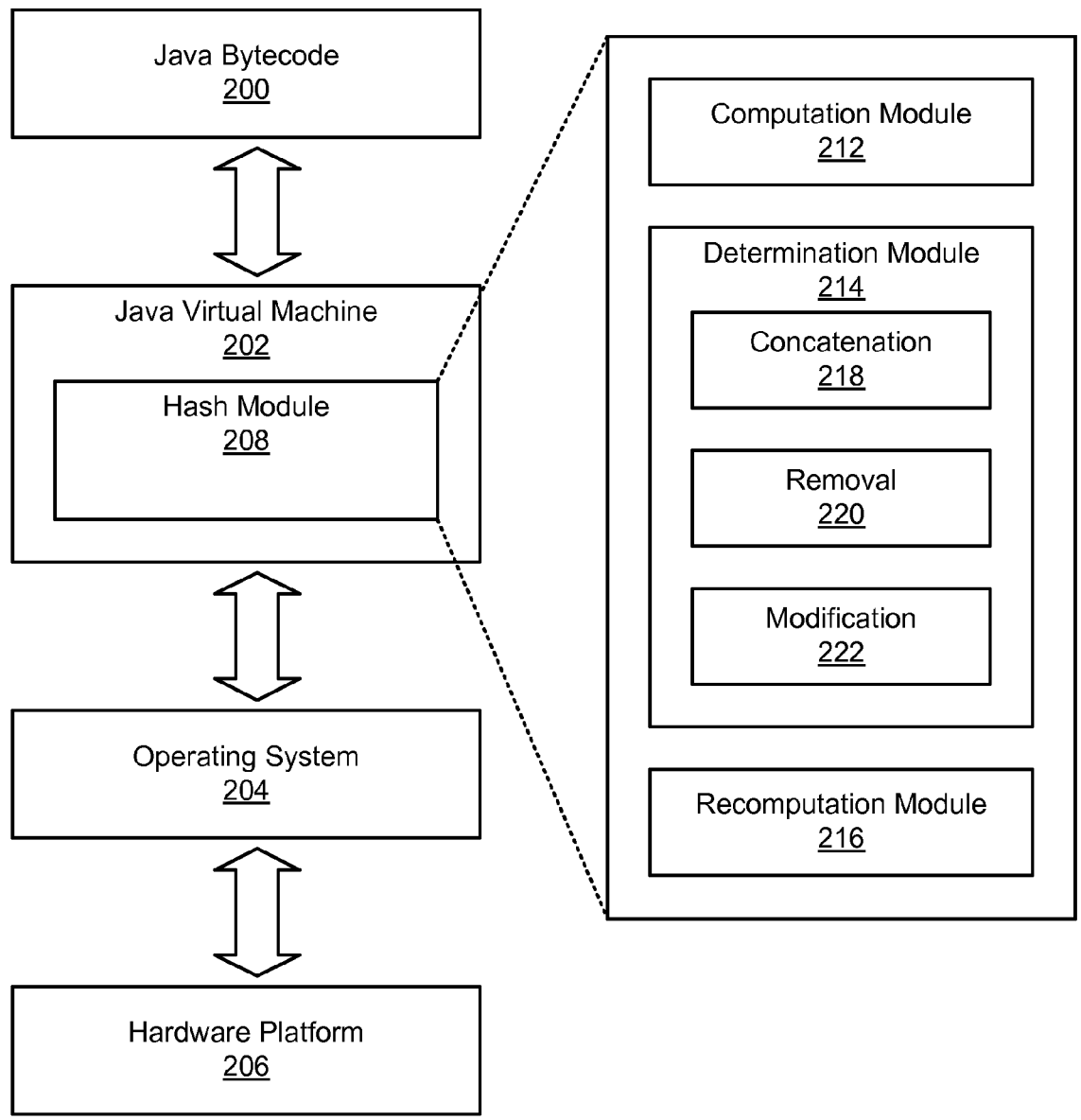
FIG. 2 is a high-level block diagram showing one example of an object-oriented managed runtime, in this example the Java Virtual Machine, comprising a hash module in accordance with the invention.

As shown in FIG. 2, in the Java Runtime Environment, a Java Virtual Machine 202 may be configured to operate on a specific platform, which may include an underlying hardware and operating system architecture 204, 206. As shown, the Java Virtual Machine 202 receives program code 200, compiled to an intermediate form referred to as "bytecode" 200. The Java Virtual Machine 202 translates this bytecode 200 into native operating system calls and machine instructions for execution on the underlying platform 204, 206. Instead of compiling the bytecode 200 for the specific hardware and software platform 204, 206, the bytecode 200 may be compiled once to operate on all Java Virtual Machines 202. A Java Virtual Machine 202, by contrast, may be tailored to the underlying hardware and software platform 204, 206. In this way, the Java bytecode 200 may be considered platform independent.

As previously mentioned, the Java runtime uses the String class extensively. In the Java runtime, every string has a hash value computed over the contents of the string in order to identify the string. Each time a string is modified, such as by concatenating a substring to an existing string, removing a substring from the beginning or end of an existing string, or modifying a substring within an existing string that preserves the length of the string, the hash value for the modified string needs to be recomputed. For the purposes of this disclosure, the functionality used to compute or recompute a hash value associated with a string will be referred to as a hash module 208. While the hash module 208 is shown in a Java Virtual Machine 202, it should be recognized that the hash module 208 may also be adapted to programming languages and runtime environments other than Java. Thus, nothing in this disclosure should be interpreted to limit the hash module 208 to the Java Runtime Environment.

As shown, in certain embodiments, the hash module 208 may include one or more of a computation module 212, a determination module 214, and a recomputation module 216. When a string is initially created, the computation module 212 may compute the hash value for the string from scratch. When such a string is updated, however, a determination module 214 may determine the type of change that has occurred to the string. For example, the determination module 214 may determine whether a substring has been concatenated 218 to the existing string, a substring has been removed 220 from the beginning and/or end of the existing string, a substring has been modified 222 within the existing string while preserving the length of the existing string, or the like. Based on the type of change that has occurred to the existing string, a recomputation module 216 may efficiently recompute the hash value for the updated string. In doing so, the recomputation module 216 may compute the hash value for the updated string by performing one or more operations on the original hash value of the original string. This recomputation may be less computationally intensive than recomputing the hash value for the updated string from scratch.

In the following discussion associated with FIGS. 3A through 5B, various techniques will be described for computing the hash value for strings which are derived from other strings that already have their hash value computed. The following techniques avoid the need to recompute a hash value for an updated string from scratch, thereby increasing efficiency. Various equations will be presented below to illustrate these techniques. In these equations, the "%" symbol will be used to represent a modulus operator and the "." symbol will be used to indicate string concatenation.

Referring to FIG. 3A, consider the case where a substring T is concatenated to an existing string S, such as where the string "g h i j" is concatentated to the end of the existing string "a b c d e f". The n-byte string S may be represented as follows:

$$S=\{s[0], s[1], s[2] \ldots s[n-2], s[n-1]\}$$

where s[0], s[1], ... s[n−1] represent each of the characters of the string S.

The hash value H(S) may be computed using the following polynomial:

$$H(S)=k^{(n-1)}s[0]+k^{(n-2)}s[1]+k^{(n-3)}s[2]+ \ldots +k^2s[n-3]+k^1s[n-2]+k^0s[n-1]$$

where $k^{(n-1)}$, $k^{(n-2)}$, $k^{(n-3)}$, ..., $k^2$, $k^1$, $k^0$ are coefficients. In certain embodiments, all addition is performed modulo g. In the case of Java, modulus g is equal to $2^{32}$ and the constant k is equal to 31.

The polynomial illustrated above may be expressed in the form of Horner's rule as follows:

$$H(S)=k(k( \ldots (k(k(ks[0]+s[1])+s[2])+s[3]) \ldots +s[n-3])+s[n-2])+s[n-1]$$

Given two strings S and T of lengths n and m respectively, the hash value H(S.T) for the concatenated strings may be expressed as follows:

$$H(S.T)=k^{(n+m-1)}s[0]+k^{(n+m-2)}s[1]+k(n+m-3)s[2]+ \ldots +k^{(m+2)}s[n-3]+k^{(m+1)}s[n-2]+k^{(m)}s[n-1]+k^{(m-1)}t[0]+k^{(m-2)}t[1]+k^{(m-3)}t[2]+ \ldots +k^{(2)}t[m-3]+kt[m-2]+t[m-1]$$

Assuming that H(S) and H(T) have already been computed, the hash value of the concatenated string S.T may be computed as follows, as illustrated in FIG. 3B:

$$H(S.T)=k^m H(S)+H(T)$$

The above equation avoids the need to recompute the hash value of the concatenated string S.T from scratch.

This equation may be extended to compute the hash value of more than two concatenated strings, such as the following equation which computes the hash value for three concatenated strings:

$$H(S.T.U)=k^{(m+n)}H(S.T)+H(U)$$

In certain embodiments, the techniques described above may be used to compute the hash value of a long string in parallel. For example, consider a string S which is the concatenation of multiple substrings S0, S1, ..., Sf−1, Sf. Without a loss of generality, assume that each substring is of length p. The sub-hash values H[S0], H[S1], ..., H[Sf−1], H[Sf] may be computed and combined as follows:

$$H(S)=H(S0)(k^{(pf)})+H(S1)k^{(p(f-1))}+ \ldots +H(Sf-1)(k^p)+H(Sf)$$

where each of the components $H(S0)(k^{(pf)})$, $H(S1)(k^{(p(f-1))})$, ..., $H(Sf-1)(k^p)$, $H(Sf)$ may be processed by a different processor core.

Alternatively, the sub-hash values may be computed in an interleaved fashion. For example, assuming the sub-hash values are computed in a four-way parallel fashion, the four sub-hash values may be computed as follows:

$$H(S0)=k^{(n-1)}s[0]+k^{(n-5)}s[4]+k^{(n-9)}s[8]+ \ldots$$

$$H(S1)=k^{(n-2)}s[1]+k^{(n-6)}s[5]+k^{(n-10)}s[9]+ \ldots$$

$$H(S2)=k^{(n-3)}s[2]+k^{(n-7)}s[6]+k^{(n-11)}s[10]+ \ldots$$

$$H(S3)=k^{(n-4)}s[3]+k^{(n-8)}s[7]+k^{(n-12)}s[11]+ \ldots$$

where S0 contains the first character of each substring in the string S, S1 contains the second character of each substring in the string S, S2 contains the third character of each substring in the string S, and S3 contains the fourth character of each substring in the string S. Once the sub-hash values for S0, S1, S2, and S3 are calculated, the hash value for the string S may be computed by summing the results as follows:

$$H(S)=H(S0)+H(S1)+H(S2)+H(S3)$$

Figures 4A, 4B:
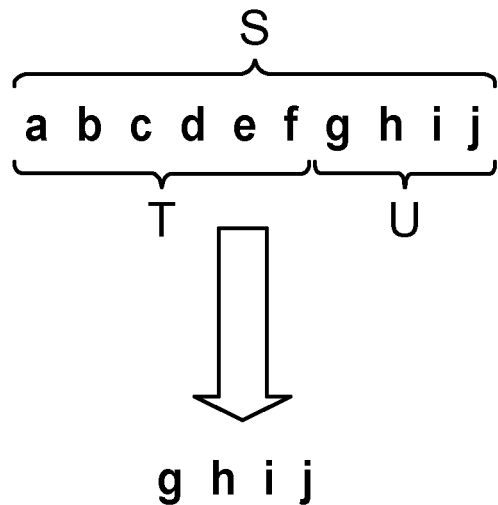
FIG. 4A shows a second scenario where a substring is removed from an existing string to produce an updated string.
FIG. 4B shows a technique for efficiently computing the hash value for the updated string illustrated in FIG. 4A.

Referring to FIG. 4A, consider the case where a substring T is removed form a string S, leaving the substring U, such as where the leading substring string "a b c d e f" is removed from the string "a b c d e f g h i f", thereby leaving the string "g h i j". The n-byte string S may be represented as follows:

$$S=T.U$$

where substring T is of length m.

Accordingly, the hash value for the substring U may be computed as follows, as shown in FIG. 4B:

$$H(U)=H(S)-k^m H(T)$$

where the hash value H(S) is known (assuming it has already been computed) and the hash value H(T) is unknown.

To compute the hash value H(T) of the leading substring T, it can be shown how to compute H(T) when the length of U is one character. Since the value of the polynomial without the modulus operation is generally greater than g, the following equation generally applies:

$$H(S)=(H(T)k+H(U)) \% g$$

or $$H(T)k+H(U)=H(S)+m$$

where m is an integer multiple of g.

Rearranging the terms yields:

$$H(T)k=H(S)-H(U)+m$$

Dividing both sides of the equation by k yields:

$$H(T)=(H(S)-H(U)+m)/k$$

which leaves no remainder.

To find m, the remainder r may be calculated as follows:

$$r=(H(S)-H(U))\% k$$

This in turn yields:

$$m=(k-r)u$$

where u is a multiple of g selected in advance such that:

$$u \% k=1$$

This equation may be applied recursively to compute the hash value when several characters are removed from the end of a string. Furthermore, by replacing k in the above equations with a power of k, multiple characters may be removed simultaneously.

Figures 5A, 5B:
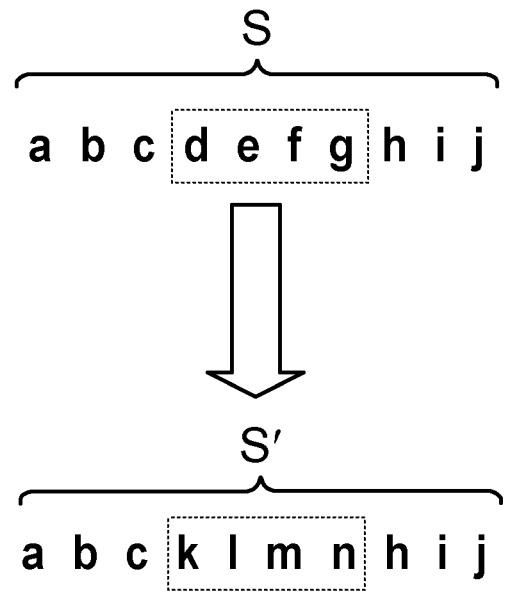
FIG. 5A shows a third scenario where a substring is modified within an existing string while preserving the length of the existing string.
FIG. 5B shows a technique for efficiently computing the hash value for the updated string illustrated in FIG. 5A.

Referring to FIG. 5A, consider the case where a substring (indicated in the dotted box) within a string S is modified to yield an updated string S' that preserves the length of the original string S. In the illustrated example, the substring "d e f g" within the string S is changed to "k l m n" to yield the updated string S'.

The original string S may be represented as follows:

$$S=\{s[0], s[1], s[2], \ldots s[p], s[p-1], \ldots, s[q+1], s[q], \ldots, s[n-2], s[n-1]\}$$

where the characters between s[p] and s[q] are those that are to be modified.

The updated string S' may be represented as follows:

$$S'=\{s[0], s[1], s[2] \ldots s'[p], s'[p-1], \ldots s'[q+1], s'[q] \ldots s[n-2], s[n-1]\}$$

where s'[p] and s'[q] are the first and last characters respectively of the modified substring.

The hash value of the altered string S' may be computed by examining the modified characters, such that:

$$S'=S+R$$

where $$R=\{0 \ldots 0, s'[p]-s[p], s'[p-1]-s[p-1], \ldots, s'[q+1]-s[q+1], s'[q]-s[q], 0 \ldots 0\}$$

The hash value of the updated string S' may then be computed as follows, as shown in FIG. 5B:

$$H(S')=H(S)+H(R)$$

where $$H(R)=k^p(s'[p]-s[p])+k^{(p-1)}(s'[p-1]-s[p-1])+ \ldots +k^{(q+1)}(s'[q+1]-s[q+1])+k^q(s'[q]-s[q])$$

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. A method for efficiently computing a hash value for a string, the method comprising:
    receiving an original string comprising a plurality of characters;
    computing an original hash value for the original string;
    modifying the original string with a substring to produce an updated string, wherein modifying the original string comprises at least one of: concatenating the substring to the original string; removing the substring from the original string; and modifying the substring within the original string;
    computing a new hash value for the substring; and
    computing an updated hash value for the updated string as a function of the original hash value and the new hash value.

2. A computer program product for efficiently computing a hash value for a string, the computer program product comprising a non-transitory computer-readable storage medium having computer-usable program code embodied therein, the computer-usable program code comprising:
    computer-usable program code to receive an original string comprising a plurality of characters;
    computer-usable program code to compute an original hash value for the original string;
    computer-usable program code to modify the original string with a substring to produce an updated string, wherein modifying the original string comprises at least one of: concatenating the substring to the original string; removing the substring from the original string; and modifying the substring within the original string;
    computer-usable program code to compute a new hash value for the substring; and
    computer-usable program code to compute an updated hash value for the updated string as a function of the original hash value and the new hash value.

3. An apparatus for efficiently computing a hash value for a string, the apparatus comprising:
    at least one processor;
    at least one memory device coupled to the at least one processor and storing computer instructions for execution on the at least one processor, the computer instructions enabling the at least one processor to:
    receive an original string comprising a plurality of characters;
    compute an original hash value for the original string;
    modify the original string with a substring to produce an updated string, wherein modifying the original string comprises at least one of: concatenating the substring to the original string; removing the substring from the original string; and modifying the substring within the original string;
    compute a new hash value for the substring; and
    compute an updated hash value for the updated string as a function of the original hash value and the new hash value.

* * * * *